United States Patent
Fujimura et al.

(10) Patent No.: US 8,207,778 B2
(45) Date of Patent: Jun. 26, 2012

(54) PHYSICAL QUANTITY SENSOR

(75) Inventors: Manabu Fujimura, Chiba (JP); Minoru Ariyama, Chiba (JP); Daisuke Muraoka, Chiba (JP); Tomoki Hikichi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 74 days.

(21) Appl. No.: 12/961,063

(22) Filed: Dec. 6, 2010

(65) Prior Publication Data

US 2011/0133812 A1 Jun. 9, 2011

(30) Foreign Application Priority Data

Dec. 7, 2009 (JP) ................................. 2009-277914

(51) Int. Cl.
*H03K 17/16* (2006.01)
*H03K 17/30* (2006.01)

(52) U.S. Cl. ........ 327/379; 327/423; 327/424; 327/494; 327/508

(58) Field of Classification Search .................. 327/92, 327/108–112, 379, 389, 391, 423–424, 494, 327/508, 587, 588; 326/22–27, 81–87
See application file for complete search history.

(56) References Cited

U.S. PATENT DOCUMENTS

| 5,608,616 A * | 3/1997 | Umeda et al. ................. 363/132 |
| 5,880,621 A * | 3/1999 | Ohashi .......................... 327/534 |
| 6,236,583 B1 * | 5/2001 | Kikuchi et al. ............... 363/132 |
| 7,176,651 B2 * | 2/2007 | Kifuku et al. ................. 318/801 |
| 2006/0062026 A1 * | 3/2006 | Wittenbreder, Jr. ........ 363/21.06 |
| 2009/0196082 A1 * | 8/2009 | Mazumder et al. ........... 363/132 |
| 2010/0026281 A1 * | 2/2010 | Nishikawa ............... 324/207.13 |

* cited by examiner

*Primary Examiner* — Lincoln Donovan
*Assistant Examiner* — Brandon S Cole
(74) *Attorney, Agent, or Firm* — Brinks Hofer Gilson & Lione

(57) ABSTRACT

Provided is a physical quantity sensor capable of improving physical quantity detection precision thereof. The physical quantity sensor includes a bridge resistance type physical quantity detection element for generating a voltage based on a bias current and a physical quantity, a current supply circuit for supplying the bias current to the physical quantity detection element, and a leakage current control circuit for causing leakage currents flowing when switches of the current supply circuit are in an off state to flow into a ground terminal.

8 Claims, 6 Drawing Sheets

US 8,207,778 B2

PHYSICAL QUANTITY SENSOR

RELATED APPLICATIONS

This application claims priority under 35 U.S.C. §119 to Japanese Patent Application No. 2009-277914 filed on Dec. 7, 2009, the entire content of which is hereby incorporated by reference.

BACKGROUND OF THE INVENTION

1. Field of the Invention

The present invention relates to a physical quantity sensor.

2. Description of the Related Art

A conventional magnetic sensor is described as an example of a physical quantity sensor. FIG. 6 is a circuit diagram illustrating the conventional magnetic sensor.

First, a signal S1 is controlled to a high level and a signal S2 is controlled to a low level. A signal S1X is an inverted signal of the signal S1. A signal S2X is an inverted signal of the signal S2. When a PMOS transistor 90 and an NMOS transistor 93 are turned on, a bias current flows through a magnetic detection element 98 between the transistors. As a result, a voltage Va which is a sum of a Hall voltage Vh based on the bias current and a magnetic field applied to the magnetic detection element 98 and an offset voltage Voh of the magnetic detection element 98 is generated between a first terminal and a fourth terminal of the magnetic detection element 98. The voltage Va is expressed by the following Expression (11).

$$Va = +Vh + Voh \qquad (11)$$

In this case, switches 94 and 95 are in an on state, and hence the voltage Va is input to an amplifier 99.

Next, the signal S1 is controlled to a low level. The signal S1X is controlled to a high level. The signal S2 is controlled to a high level. The signal S2X is controlled to a low level. Then, switching is performed so that a bias current flowing between a second terminal and a third terminal of the magnetic detection element 98 flows between the fourth terminal and the first terminal. In addition, switching is performed so that the Hall voltage Vh generated between the fourth terminal and the first terminal of the magnetic detection element 98 is generated between the third terminal and the second terminal. At this time, a voltage Vb is expressed by the following Expression (12).

$$Vb = -Vh + Voh \qquad (12)$$

In this case, switches 96 and 97 are in an on state, and hence the voltage Vb is input to the amplifier 99.

After that, the voltages Va and Vb which are amplified by the amplifier 99 are subjected to subtraction processing performed by an operating circuit (not shown) to cancel out the offset voltage Voh (see, for example, Japanese Patent Application Laid-open No. 2009-002851).

When the voltage Va is generated in the magnetic sensor as described above, leakage currents flow through the PMOS transistor 91 and the NMOS transistor 92 which are each in an off state. When the voltage Vb is generated, leakage currents flow through the PMOS transistor 90 and the NMOS transistor 93 which are each in an off state.

Even when the PMOS transistors 90 and 91 are manufactured in the same size and the NMOS transistors 92 and 93 are manufactured in the same size, the leakage currents vary because of semiconductor manufacturing variations. As a result, the offset voltages Voh cannot be cancelled out appropriately, and hence the magnetic detection precision of the magnetic sensor reduces.

SUMMARY OF THE INVENTION

The prevent invention has been made in view of the problem described above, and it is an object of the present invention to provide a physical quantity sensor capable of improving physical quantity detection precision thereof.

In order to solve the above-mentioned problem, the present invention provides a physical quantity sensor, including: a current supply circuit including first to fourth switches, for supplying a bias current to a physical quantity detection element; the physical quantity detection element which is of a bridge type and includes first to fourth terminals, for generating a voltage based on the bias current supplied from the current supply circuit and a physical quantity; and a leakage current control circuit for causing leakage currents flowing through two of the first switch, the second switch, the third switch, and the fourth switch which are in an off sate in the current supply circuit to flow into one of a power supply terminal and a ground terminal.

According to the present invention, even when the leakage currents flow through the switches of the current supply circuit which are in the off state, the leakage currents in the off state are less likely to flow into the physical quantity detection element because the leakage current control circuit is provided with respect to the current supply circuit. Therefore, the leakage currents in the off state are less likely to affect the voltage based on the physical quantity applied to the physical quantity detection element. Thus, the physical quantity detection precision of the physical quantity sensor is improved.

DETAILED DESCRIPTION OF THE PREFERRED EMBODIMENT

Hereinafter, a magnetic sensor which is an example of a physical quantity sensor according to the present invention is described with reference to the attached drawings.

Figure 1:
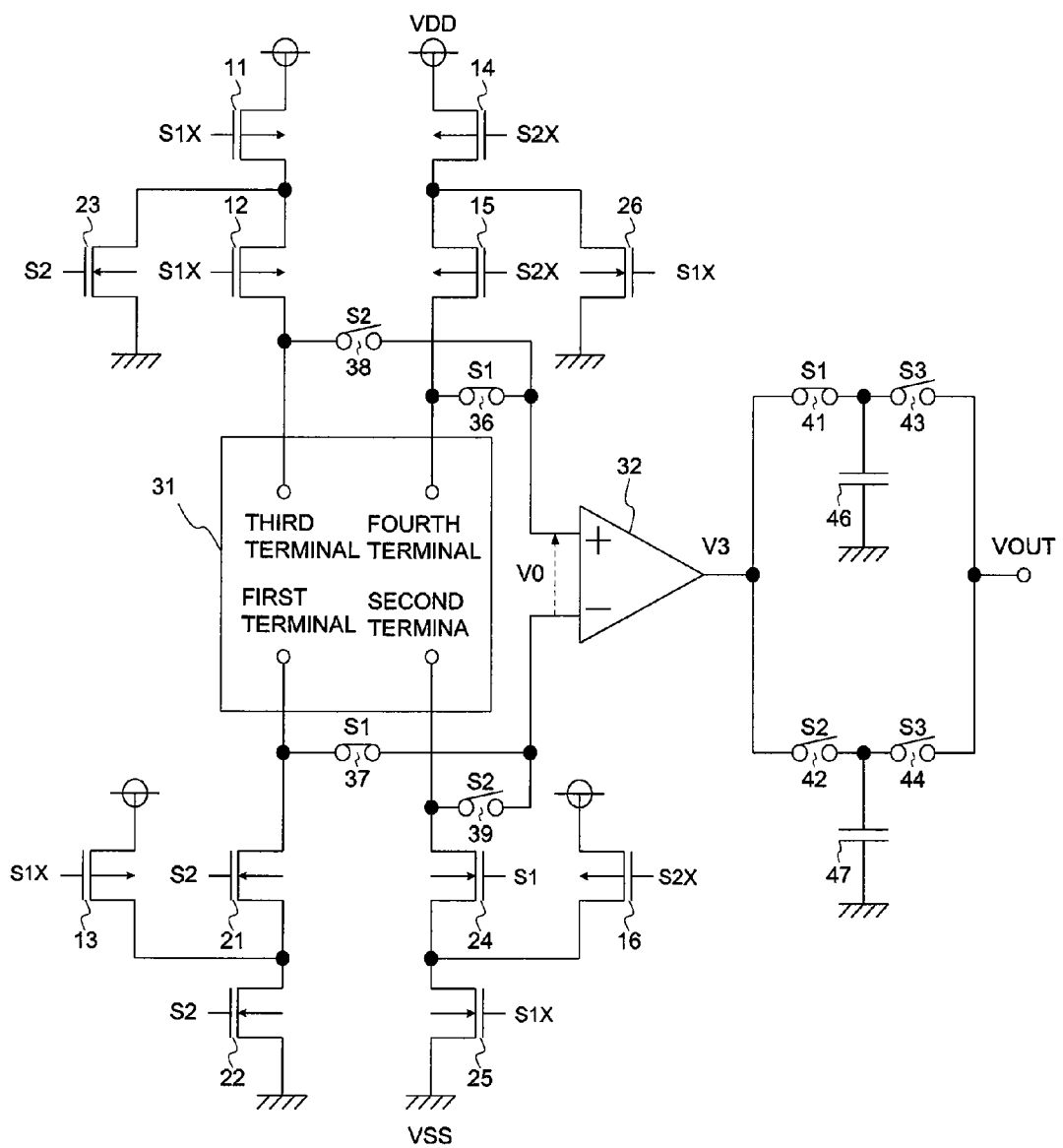
FIG. 1 is a circuit diagram illustrating a magnetic sensor according to an embodiment of the present invention.

FIG. 1 is a circuit diagram illustrating a magnetic sensor according to an embodiment of the present invention.

The magnetic sensor according to the embodiment of the present invention includes PMOS transistors 11 to 16, NMOS transistors 21 to 26, a magnetic detection element 31, an amplifier 32, switches 36 to 39, switches 41 to 44, and capacitors 46 and 47. A set of the PMOS transistor 11 and the NMOS transistor 25 and a set of the PMOS transistor 14 and the NMOS transistor 22 each serve as a current supply circuit. The PMOS transistor 15 and the NMOS transistor 26 serve as a leakage current control circuit for the PMOS transistor 14. The PMOS transistor 13 and the NMOS transistor 21 serve as a leakage current control circuit for the NMOS transistor 22.

The PMOS transistor 12 and the NMOS transistor 23 serve as a leakage current control circuit for the PMOS transistor 11. The PMOS transistor 16 and the NMOS transistor 24 serve as a leakage current control circuit for the NMOS transistor 25.

Figure 2:
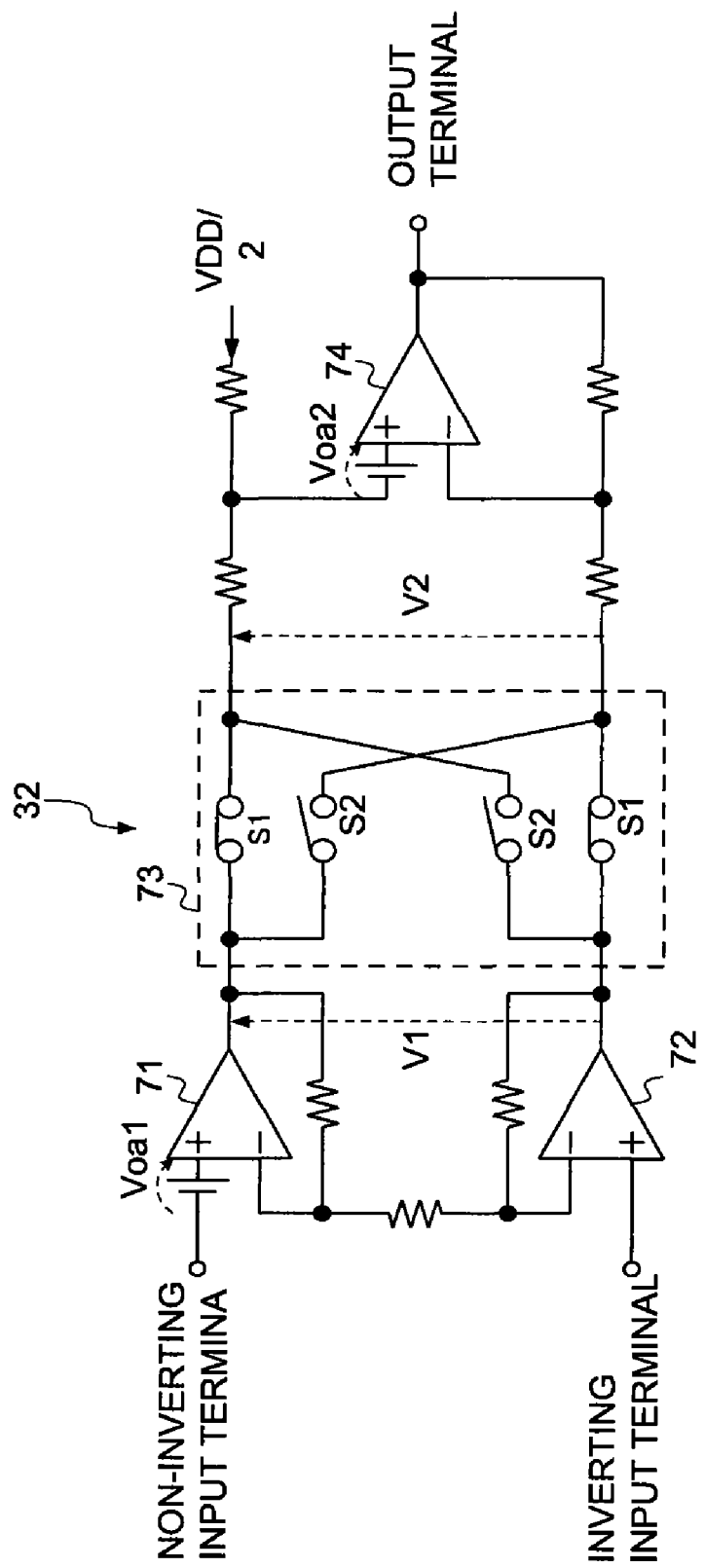
FIG. 2 is a circuit diagram illustrating an example of an amplifier of the magnetic sensor according to the embodiment of the present invention.

FIG. 2 is a circuit diagram illustrating an example of the amplifier of the magnetic sensor according to this embodiment. The amplifier 32 includes, for example, first-stage amplifiers 71 and 72, a chopper circuit 73, a second-stage amplifier 74.

Gate voltages of the PMOS transistors 11 to 13 are controlled based on a signal S1 or a signal S1X. Gate voltages of the PMOS transistors 14 to 16 are controlled based on a signal S2 or a signal S2X. Gate voltages of the NMOS transistors 21 to 23 are controlled based on the signal S2 or the signal S2X. Gate voltages of the NMOS transistors 24 to 26 are controlled based on the signal S1 or the signal S1X. The switches 36, 37, and 41 are controlled based on the signal S1 or the signal S1X. The switches 38, 39, and 42 are controlled based on the signal S2 or the signal S2X. The switches 43 and 44 are controlled based on a signal S3.

A source of the PMOS transistor 13 is connected to a power supply terminal and a drain thereof is connected to a connection point between a source of the NMOS transistor 21 and a drain of the NMOS transistor 22. A source of the PMOS transistor 16 is connected to a power supply terminal and a drain thereof is connected to a connection point between a source of the NMOS transistor 24 and a drain of the NMOS transistor 25. A drain of the NMOS transistor 21 is connected to a first terminal of the magnetic detection element 31. A drain of the NMOS transistor 24 is connected to a second terminal of the magnetic detection element 31. A source of the NMOS transistor 22 and a source of the NMOS transistor 25 are each connected to a ground terminal.

A source of the NMOS transistor 23 is connected to a ground terminal and a drain thereof is connected to a connection point between a drain of the PMOS transistor 11 and a source of the PMOS transistor 12. A source of the NMOS transistor 26 is connected to a ground terminal and a drain thereof is connected to a connection point between a drain of the PMOS transistor 14 and a source of the PMOS transistor 15. A drain of the PMOS transistor 12 is connected to a third terminal of the magnetic detection element 31. A drain of the PMOS transistor 15 is connected to a fourth terminal of the magnetic detection element 31. A source of the PMOS transistor 11 and a source of the PMOS transistor 14 are each connected to a power supply terminal.

A non-inverting input terminal of the amplifier 32 is connected to the third terminal of the magnetic detection element 31 through the switch 38 and the fourth terminal of the magnetic detection element 31 through the switch 36. An inverting input terminal of the amplifier 32 is connected to the first terminal of the magnetic detection element 31 through the switch 37 and the second terminal of the magnetic detection element 31 through the switch 39.

The switches 41 and 43 are connected in series between an output terminal of the amplifier 32 and an output terminal of the magnetic sensor. The switches 42 and 44 are connected in series between the output terminal of the amplifier 32 and the output terminal of the magnetic sensor. The set of switches 41 and 43 and the set of 42 and 44 are connected in parallel. The capacitor 46 is provided between a connection point between the switches 41 and 43 and the ground terminal. The capacitor 47 is provided between a connection point between the switches 42 and 44 and the ground terminal.

As illustrated in FIG. 2, in the amplifier 32, an output voltage of a first amplification stage including the first-stage amplifiers 71 and 72 is input to a second amplification stage including the second-stage amplifier 74 through the chopper circuit 73.

Each of the current supply circuits supplies a bias current to the magnetic detection element 31. The magnetic detection element 31 is of a bridge type and generates a Hall voltage Vh based on the bias current and a magnetic field. The leakage current control circuits cause the leakage currents flowing through the MOS transistors which are in the off state in each of the current supply circuits to flow into the power supply terminal or the ground terminal.

Figure 3:
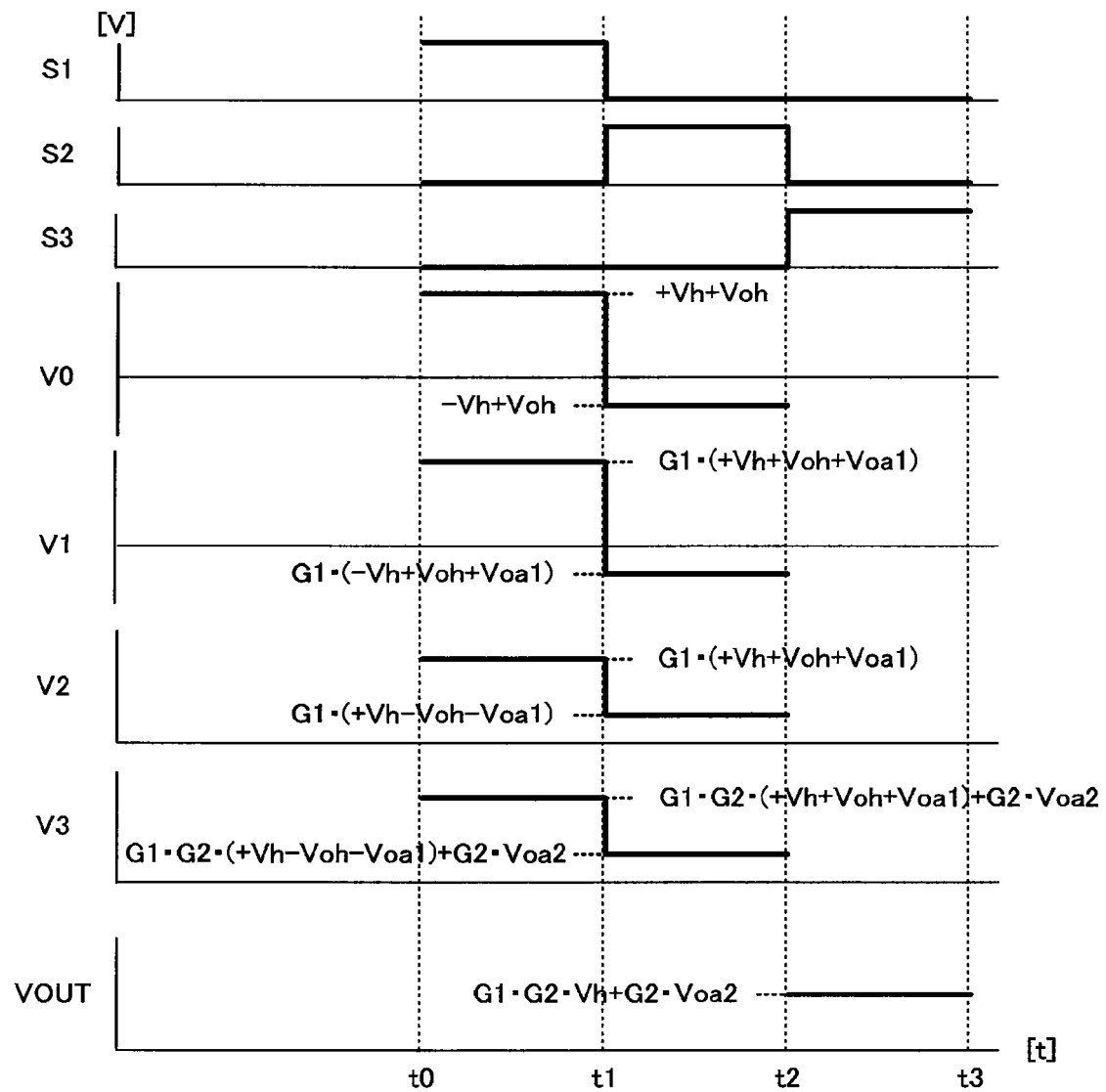
FIG. 3 is a time chart illustrating an operation of the magnetic sensor according to the embodiment of the present invention.

Next, an operation of the magnetic sensor is described. FIG. 3 is a time chart illustrating the operation of the magnetic sensor according to this embodiment.

First, during a period of t0<t<t1, the signal S1 is controlled to a high level, the signal S2 is controlled to a low level, and the signal S3 is controlled to a low level. The signal S1X is an inverted signal of the signal S1. The signal S2X is an inverted signal of the signal S2. Therefore, the PMOS transistors 11 and 12 and the NMOS transistors 24 and 25 are each in an on state, and hence a bias current flows through the magnetic detection element 31 between the transistors. Then, a voltage V0 which is a sum of a Hall voltage Vh based on the bias current and a magnetic field applied to the magnetic detection element 31 and an offset voltage Voh of the magnetic detection element 31 is generated between the fourth terminal and the first terminal of the magnetic detection element 31. The voltage V0 is expressed by the following Expression (1).

$$V0 = +Vh + Voh \quad (1)$$

The switches 36 and 37 are in an on state, and hence the voltage V0 is input to the amplifier 32. The voltage V0 and an offset voltage Voa1 of the first amplification stage including the first-stage amplifiers 71 and 72 are amplified by the first amplification stage having a gain G1 to generate a voltage V1. The voltage V1 is expressed by the following Expression (2).

$$V1 = G1 \cdot (+Vh + Voh + Voa1) \quad (2)$$

The chopper circuit 73 does not change a path, and hence the voltage V1 directly becomes a voltage V2 without any change. The voltage V2 is expressed by the following Expression (3).

$$V2 = G1 \cdot (+Vh + Voh + Voa1) \quad (3)$$

The voltage V2 is input to the second amplification stage including the second-stage amplifier 74. The voltage V2 and an offset voltage Voa2 of the second amplification stage including the second-stage amplifier 74 are amplified by the second amplification stage having a gain G2 to generate a voltage V3. The voltage V3 is expressed by the following Expression (4).

$$V3 = G1 \cdot G2(+Vh + Voh + Voa1) + G2 \cdot Voa2 \quad (4)$$

The switch 41 is in an on state, and hence the voltage V3 is stored in the capacitor 46.

The PMOS transistor 14 of the current supply circuit is in an off state, but a leakage current flows therethrough. However, the NMOS transistor 26 of the leakage current control circuit is in an on state, and hence the leakage current of the PMOS transistor 14 flows into the ground terminal through the NMOS transistor 26. In addition, a source voltage of the PMOS transistor 15 becomes a ground voltage VSS, and hence a threshold voltage increases because of a substrate bias effect. Therefore, the leakage current is less likely to flow. That is, the leakage current of the PMOS transistor 14 is less likely to flow into the fourth terminal of the magnetic detection element 31.

Similarly, a leakage current flows through the NMOS transistor 22 of the current supply circuit, but is less likely to flow because of the PMOS transistor 13 and the NMOS transistor 21. That is, the leakage current of the NMOS transistor 22 is less likely to flow from the first terminal of the magnetic detection element 31.

Therefore, the leakage currents do not substantially affect the voltage V0 of Expression (1) because of the leakage current control circuits, and thus do not substantially affect an output voltage VOUT.

Next, during a period of t1<t<t2, the signal S1 is controlled to a low level, the signal S2 is controlled to a high level, and the signal S3 is controlled to a low level. Then, switching is performed so that the bias current flowing between the third terminal and the second terminal of the magnetic detection element 31 flows between the fourth terminal and the first terminal. In addition, switching is performed so that the Hall voltage Vh generated between the fourth terminal and the first terminal of the magnetic detection element 31 is generated between the third terminal and the second terminal. Therefore, the voltages V0 and V1 are expressed by the following Expressions (5) and (6).

$$V0 = -Vh + Voh \quad (5)$$

$$V1 = G1 \cdot (-Vh + Voh + Voa1) \quad (6)$$

The chopper circuit 73 changes the path. Specifically, the voltage V1 is chopped into the voltage V2 by the chopper circuit 73. Therefore, the voltages V2 and V3 are expressed by the following Expressions (7) and (8).

$$V2 = G1 \cdot (+Vh - Voh - Voa1) \quad (7)$$

$$V3 = G1 \cdot G2(+Vh - Voh - Voa1) + G2 \cdot Voa2 \quad (8)$$

The capacitor 46 is changed to the capacitor 47 to store the voltage V3.

As in the case described above, a leakage current of the PMOS transistor 11 is less likely to flow because of the NMOS transistor 23 and the PMOS transistor 12. In addition, a leakage current of the NMOS transistor 25 is less likely to flow because of the NMOS transistor 24 and the PMOS transistor 16.

Therefore, the leakage currents do not substantially affect the voltage V0 of Expression (5) because of the leakage current control circuits, and thus do not substantially affect an output voltage VOUT.

Next, during a period of t2<t<t3, the signal S1 is controlled to a low level, the signal S2 is controlled to a low level, and the signal S3 is controlled to a high level. The switches 43 and 44 are in an on state, and hence the capacitors 46 and 47 are connected in parallel and the respective voltages stored in the capacitors 46 and 47 are averaged to be output as output voltage VOUT. The output voltage VOUT is expressed by the following Expression (9).

$$VOUT = \{V3(\text{Expression}(4)) + V3(\text{Expression}(8))\}/2 = G1 \cdot G2 \cdot Vh + G2 \cdot Voa2 \quad (9)$$

If the leakage current control circuits are not provided with respect to the current supply circuits, even when the PMOS transistors 11 and 14 are manufactured in the same size, the leakage current in the off state of the PMOS transistor 14 during the period of t0<t<t1 and the leakage current in the off state of the PMOS transistor 11 during the period of t1<t<t2 are different from each other because of semiconductor manufacturing variations. As a result, the degree of influence of the leakage current on the voltage V0 in the off state is changed between the period of t0<t<t1 and the period of t1<t<t2. In other words, the offset voltage Voh of the magnetic detection element 31 is changed in appearance between the period of t0<t<t1 and the period of t1<t<t2. Therefore, in Expression (9), a voltage based on the offset voltage Voh of the magnetic detection element 31 affects the output voltage VOUT. The same may apply to the NMOS transistors 22 and 25.

However, according to the present invention, the leakage current control circuits are provided with respect to the current supply circuits, and the offset voltage Voh of the magnetic detection element 31 is substantially the same between the period of t0<t<t1 and the period of t1<t<t2.

Therefore, even when the leakage current flows through the MOS transistor which is in the off state in the current supply circuit, the leakage current in the off state is less likely to flow into the magnetic detection element 31 because the leakage current control circuit is provided with respect to the current supply circuit. Then, the leakage current in the off state is less likely to affect the voltage based on the magnetic field applied to the magnetic detection element 31. Thus, the magnetic detection precision of the magnetic sensor is improved.

When a temperature increases, the leakage current in the off state becomes larger correspondingly to the increase in temperature. Therefore, in a case of particularly a high temperature, the magnetic sensor according to the present invention exhibits a remarkable effect.

Figure 4:
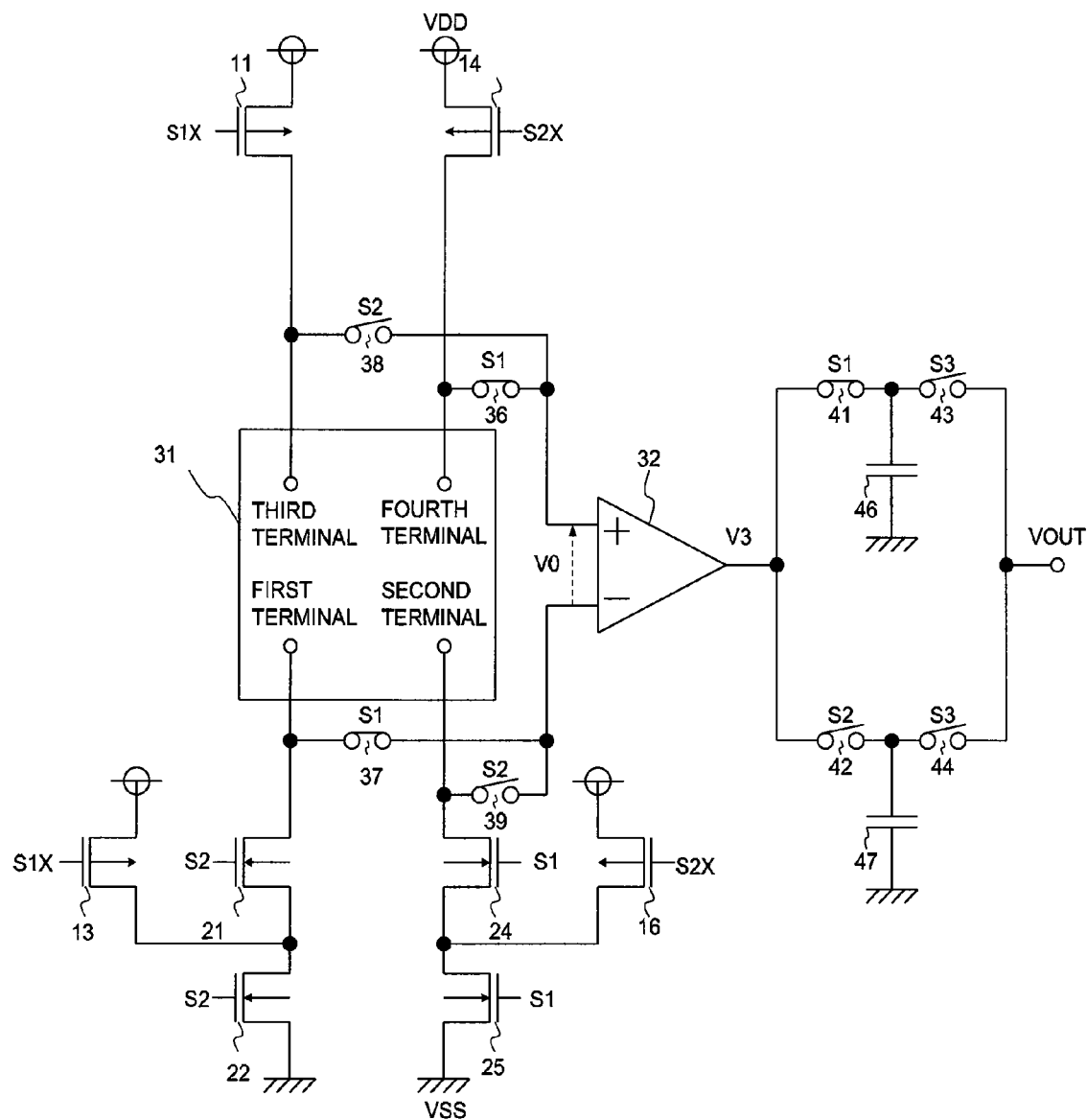
FIG. 4 is a circuit diagram illustrating another example of the magnetic sensor.

Even in the case where the leakage current control circuits are not provided with respect to the current supply circuits, when the leakage currents in the off state of the PMOS transistors 11 and 14 do not substantially affect the output voltage VOUT, the PMOS transistors 12 and 15 and the NMOS transistors 23 and 26 may be omitted as illustrated in FIG. 4.

Figure 5:
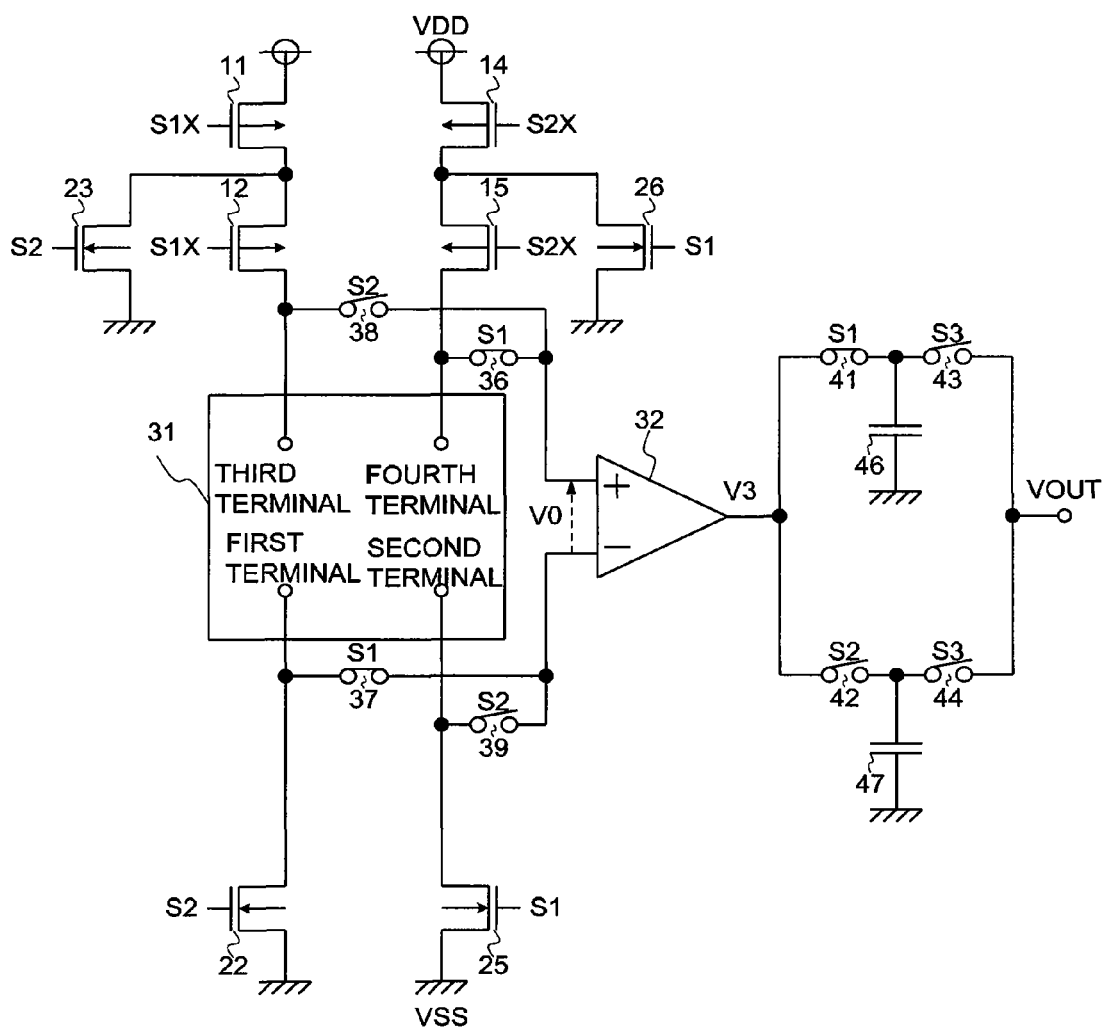
FIG. 5 is a circuit diagram illustrating a further example of the magnetic sensor.
Figure 6:
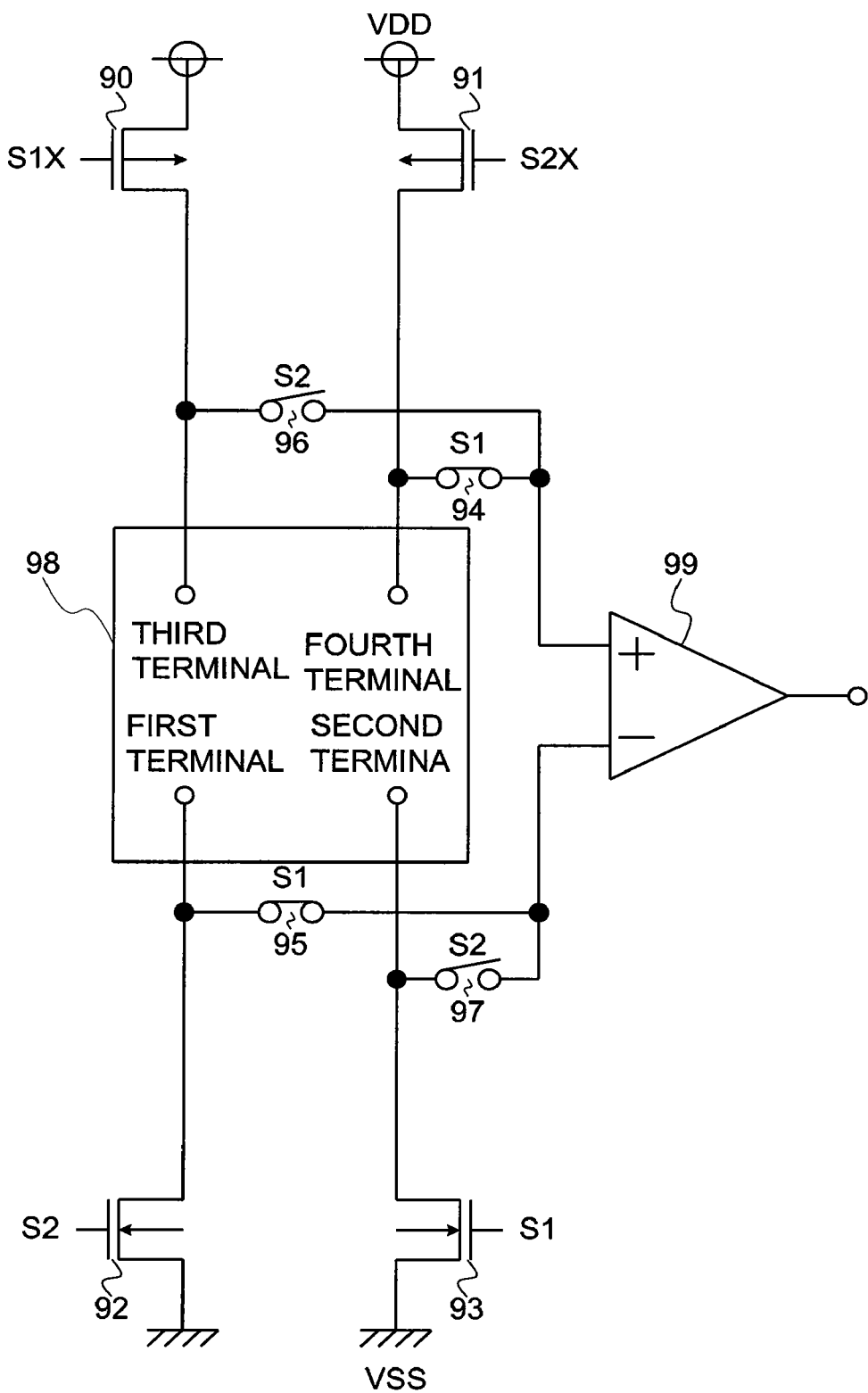
FIG. 6 is a circuit diagram illustrating a conventional magnetic sensor.

Even in the case where the leakage current control circuits are not provided with respect to for the current supply circuits, when the leakage currents in the off state of the NMOS transistors 22 and 25 do not substantially affect the output voltage VOUT, the NMOS transistors 21 and 24 and the PMOS transistors 13 and 16 may be omitted as illustrated in FIG. 5.

A comparator (not shown) which includes a first input terminal connected to the output terminal of the magnetic sensor and a second input terminal connected to an output terminal of a reference voltage generation circuit (not shown) may be provided. The comparator compares the output voltage VOUT of the magnetic sensor with a reference voltage, and inverts an output voltage based on a result obtained by the comparison. In other words, when the voltage based on the magnetic field applied to the magnetic detection element 31 reaches to a predetermined voltage, the comparator inverts the output voltage.

In FIG. 1, the NMOS transistor 23 controlled in response to the signal S2 is provided as the MOS transistor for causing the leakage current in the off state to flow into the ground terminal. However, although not illustrated, a PMOS transistor controlled in response to the signal S2X may be provided. The NMOS transistor 26 controlled in response to the signal S1 is provided, but a PMOS transistor controlled in response to the signal S1X may be provided. The PMOS transistor 13 controlled in response to the signal S1 is provided, but an NMOS transistor controlled in response to the signal S1X may be provided. The PMOS transistor 16 controlled in response to the signal S2 is provided, but an NMOS transistor controlled in response to the signal S2X may be provided.

The magnetic sensor is described as the example of the physical quantity sensor. However, the present invention is not limited to the magnetic sensor, and may be applied to a physical quantity sensor including four terminals, in which a bias current is caused to flow through two of the terminals to generate a voltage between the other two of the terminals based on the bias current and a physical quantity. For example, the present invention may be applied to a physical quantity sensor in which a resistance value of a piezoresistance element of bridge resistors is changed depending on an acceleration or a pressure to generate a voltage based on the resistance value and a bias current.

What is claimed is:

1. A physical quantity sensor, comprising:
   a current supply circuit including a first switch, a second switch, a third switch, and a fourth switch;
   a physical quantity detection element which is of a bridge type and includes a first terminal, a second terminal, a third terminal, and a fourth terminal; and
   a leakage current control circuit for causing leakage currents flowing through two of the first switch, the second switch, the third switch, and the fourth switch which are in an off sate in the current supply circuit to flow into one of a power supply terminal and a ground terminal, wherein:
      the current supply circuit supplies a bias current to the physical quantity detection element; and
      the physical quantity detection element generates a voltage based on the bias currents supplied from the current supply circuit and a physical quantity.

2. A physical quantity sensor according to claim 1, wherein:
   the first switch, the second switch, the third switch, and the fourth switch comprise a first PMOS transistor, a second PMOS transistor, a first NMOS transistor, and a second NMOS transistor, respectively;
   the leakage current control circuit comprises a third PMOS transistor, a fourth PMOS transistor, a fifth NMOS transistor, and a sixth NMOS transistor,
   the fifth NMOS transistor has a drain connected to a connection point between a drain of the first PMOS transistor and a source of the third PMOS transistor and a source connected to a ground terminal;
   the third PMOS transistor has a drain connected to the third terminal;
   the sixth NMOS transistor has a drain connected to a connection point between a drain of the second PMOS transistor and a source of the fourth PMOS transistor, and a source connected to a ground terminal; and
   a drain of the fourth PMOS transistor is connected to the fourth terminal.

3. A physical quantity sensor according to claim 2, wherein:
   the first switch, the second switch, the third switch, and the fourth switch comprise a first PMOS transistor, a second PMOS transistor, a first NMOS transistor, and a second NMOS transistor, respectively;
   the leakage current control circuit comprises a third NMOS transistor, a fourth NMOS transistor, a fifth PMOS transistor, and a sixth PMOS transistor;
   the fifth PMOS transistor has a drain connected to a connection point between a drain of the first NMOS transistor and a source of the third NMOS transistor and a source connected to a power supply terminal;
   the third NMOS transistor has a drain connected to the first terminal;
   the sixth PMOS transistor has a drain connected to a connection point between a drain of the second NMOS transistor and a source of the fourth NMOS transistor, and a source connected to a power supply terminal; and
   the fourth NMOS transistor has a drain connected to the second terminal.

4. A physical quantity sensor according to claim 1, wherein:
   the first switch, the second switch, the third switch, and the fourth switch comprise a first PMOS transistor, a second PMOS transistor, a first NMOS transistor, and a second NMOS transistor, respectively;
   the leakage current control circuit comprises a third NMOS transistor, a fourth NMOS transistor, a fifth PMOS transistor, and a sixth PMOS transistor;
   the fifth PMOS transistor has a drain connected to a connection point between a drain of the first NMOS transistor and a source of the third NMOS transistor and a source connected to a power supply terminal;
   the third NMOS transistor has a drain connected to the first terminal;
   the sixth PMOS transistor has a drain connected to a connection point between a drain of the second NMOS transistor and a source of the fourth NMOS transistor, and a source connected to a power supply terminal; and
   the fourth NMOS transistor has a drain connected to the second terminal.

5. A physical quantity sensor according to claim 1, wherein:
   the first switch, the second switch, the third switch, and the fourth switch comprise a first PMOS transistor, a second PMOS transistor, a first NMOS transistor, and a second NMOS transistor, respectively;
   the leakage current control circuit comprises a third PMOS transistor, a fourth PMOS transistor, a fifth PMOS transistor, and a sixth PMOS transistor;
   the fifth PMOS transistor has a source connected to a connection point between a drain of the first PMOS transistor and a source of the third PMOS transistor and a drain connected to a ground terminal;
   the third PMOS transistor has a drain connected to the third terminal;
   the sixth PMOS transistor has a source connected to a connection point between a drain of the second PMOS transistor and a source of the fourth PMOS transistor, and a drain connected to a ground terminal; and
   the fourth PMOS transistor has a drain connected to the fourth terminal.

6. A physical quantity sensor according to claim 5, wherein:
   the first switch, the second switch, the third switch, and the fourth switch comprise a first PMOS transistor, a second PMOS transistor, a first NMOS transistor, and a second NMOS transistor, respectively;
   the leakage current control circuit comprises a third NMOS transistor, a fourth NMOS transistor, a fifth NMOS transistor, and a sixth NMOS transistor;
   the fifth NMOS transistor has a source connected to a connection point between a drain of the first NMOS transistor and a source of the third NMOS transistor and a drain connected to a power supply terminal,
   the third NMOS transistor has a drain connected to the first terminal;
   the sixth NMOS transistor has a source connected to a connection point between a drain of the second NMOS transistor and a source of the fourth NMOS transistor, and a drain connected to a power supply terminal; and
   the fourth NMOS transistor has a drain connected to the second terminal.

7. A physical quantity sensor according to claim 1, wherein:
   the first switch, the second switch, the third switch, and the fourth switch comprise a first PMOS transistor, a second PMOS transistor, a first NMOS transistor, and a second NMOS transistor, respectively;

the leakage current control circuit comprises a third NMOS transistor, a fourth NMOS transistor, a fifth NMOS transistor, and a sixth NMOS transistor;

the fifth NMOS transistor has a source connected to a connection point between a drain of the first NMOS transistor and a source of the third NMOS transistor and a drain connected to a power supply terminal, the third NMOS transistor has a drain connected to the first terminal;

the sixth NMOS transistor has a source connected to a connection point between a drain of the second NMOS transistor and a source of the fourth NMOS transistor, and a drain connected to a power supply terminal; and the fourth NMOS transistor has a drain connected to the second terminal.

8. A physical quantity sensor according to claim 1, wherein the physical quantity comprises a magnetic field.

\* \* \* \* \*